United States Patent [19]
van der Horn

[11] 3,902,564
[45] Sept. 2, 1975

[54] WEIGHER FOR LIQUIDS
[75] Inventor: Hendrik Jelle van der Horn, Leeuwarden, Netherlands
[73] Assignee: Bond van Cooperatieve Zuivelfabrieken in Friesland, Leeuwarden, Netherlands
[22] Filed: Apr. 11, 1974
[21] Appl. No.: 460,202

[30] Foreign Application Priority Data
Apr. 11, 1973   Netherlands...................... 7305058

[52] U.S. Cl.................................. 177/94; 177/115
[51] Int. Cl.²...................................... G01G 13/22
[58] Field of Search ............................. 177/90–96, 177/114–115

[56] References Cited
UNITED STATES PATENTS
| | | | |
|---|---|---|---|
| 1,546,200 | 7/1925 | Cavins | 177/94 |
| 1,546,437 | 7/1925 | Daysh | 177/94 |
| 1,667,270 | 4/1928 | Ryder | 177/91 |

FOREIGN PATENTS OR APPLICATIONS
| | | | |
|---|---|---|---|
| 1,069,180 | 1967 | United Kingdom | 177/92 |
| 457,541 | 1913 | France | 177/94 |

Primary Examiner—Stephen J. Tomsky
Assistant Examiner—Vit W. Miska
Attorney, Agent, or Firm—Cushman, Darby & Cushman

[57] ABSTRACT

A weigher for a liquid comprising a receptacle with two compartments alternately tipped into and out of a path of flow for a liquid by a predetermined amount of liquid in one of the compartments.

The compartments each have a partition which with higher rates of flow of the liquid causes a higher column of liquid to form in an outer portion of the compartment, which advances the tipping moment and thus ensures that, irrespective of the rate of flow equal portions of liquid are measured.

5 Claims, 1 Drawing Figure

PATENTED SEP 2 1975　　　　　　　　　　　　　　　　　3,902,564
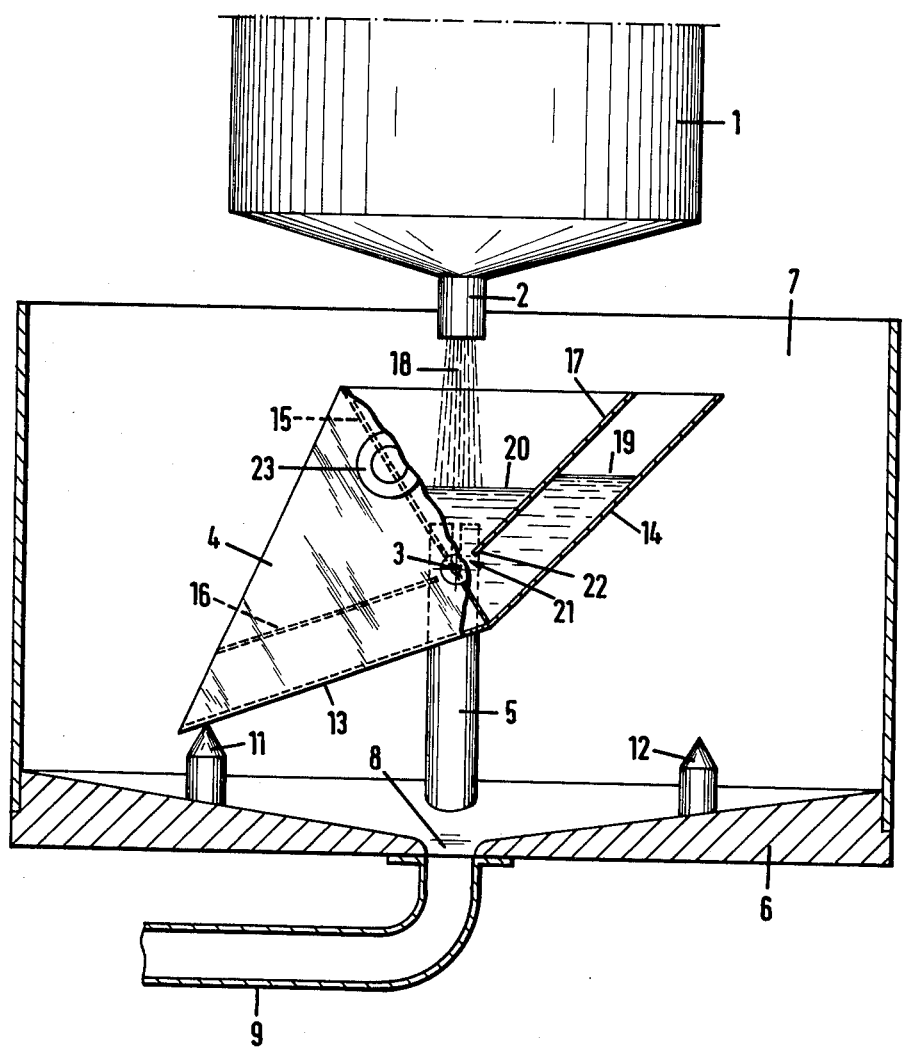

WEIGHER FOR LIQUIDS

This invention relates to an improved weigher for liquids, in particular one to be disposed in a path of flow for a liquid to measure the amount of liquid passing the weigher.

The weigher according to the present invention is of the well-known kind comprising a tipping receptacle having two compartments, an alternate one of which is continually disposed under an opening through which liquid is supplied. The principle by which a device of this kind operates is that as a compartment is filled the point of gravity of the of the receptacle is displaced laterally outwardly until, when there is a calibrated amount of liquid in the compartment, the receptacle tips over to move the filled compartment out of the path of flow of the liquid into a position in which it discharges its contents, and the other compartment into said path of flow for it to be filled in turn. The device is coupled to a suitable counter which counts the number of times the receptacle makes a tipping movement, and thus the weight of the liquid which has passed the device in a given period of time can be calculated.

The tipping moment, i.e., the amount of liquid required for each tipping movement, can be rather accurately adjusted by means of weights in conjunction with the rate of flow of the liquid. Such an adjustment is necessary because during the tipping movement the liquid continues to flow into the compartment for a short period of time until the compartment is fully out of the path of flow of the liquid. It will be clear that the amount of liquid added during this short period of time depends on the rate at which the liquid is supplied. Accordingly, with higher rates of flow the device should be adjusted to tip over at a lower level of liquid in the compartment being filled.

However, if the rate of flow of the liquid is subject to variation or fluctuation, inaccuracies owing to this effect are inevitable. It is accordingly an object of the present invention to provide a weigher for liquids which accurately weighs the amount of liquid which passes the device both at higher and lower rates of flow.

According to the present invention, there is provided a weigher for a liquid comprising a receptacle having two compartments disposed under an opening through which liquid is supplied in a path of flow and arranged to be tipped over by a pre-determined quantity of liquid in either one of said two compartments to move the same out of said path of flow for it to discharge its contents and the other one of said two compartments into said path of flow for it to be filled in turn, characterized by each compartment having means for advancing the tipping moment with higher rates of flow of the liquid.

In one embodiment of the invention the receptacle has two side walls, two end walls, and a middle wall disposed in the bisectrix plane of the angle between said end walls, each compartment being divided into two communicating chambers by a partition disposed substantially parallel to its end wall.

In a preferred embodiment of the invention the communicating chambers are connected through a slit-like opening between the middle wall and the bottom edge of the partition. This slit-like opening is disposed beneath the opening through which liquid is supplied.

It has been found that in such a construction when liquid is supplied at a low rate of flow the levels in the communicating chambers remain equal, and when liquid is supplied at a higher rate of flow the level in the chamber defined by the end wall and the partition is higher than that in the chamber communicating with it. In other words the point of gravity of the total body of water present in the compartment concerned is more rapidly displaced outwardly, so that the receptacle tips over somewhat earlier at higher rates of supply of the liquid than at lower rates. The liquid which continues to flow into the compartment during the tilting movement will then fill the compartment up to the level for which it has been calibrated.

The apparatus according to the invention is very suitable for use in a milk line. For, as is well-known, the milk is drawn more rapidly from one cow than from another. Furthermore in the initial stages of the milking process a cow gives little milk, later more, and at the end again smaller amounts per unit of time.

One embodiment of the invention will now be described, by way of example, with reference to the accompanying drawing, which shows a diagrammatic, part-sectional side elevation of apparatus according to the invention.

Referring to the drawing, there is shown a milk collecting vessel 1 having an outlet 2 in its bottom, over a tipping shaft 3 of a twin-compartment receptacle 4. Receptacle 4 has its shaft 3 supported on two columns 5, only one of which is shown in the drawing, mounted on a carrier plate 6.

Plate 6 forms the bottom of a vessel 7 and has a funnel-shaped upper surface with a central outlet 8 draining through a discharge pipe 9 to a central milk line. Mounted on the funnel-shaped bottom of carrier plate 6 are two resilient stops 11 and 12.

Receptacle 4 has end walls 13, 14, a middle wall 15 and partitions 17, 16 parallel to the respective end walls.

As shown in the drawing by way of illustration, the right-hand receptacle is filled with a strong current 18, whereby level 19 in the chamber between end wall 14 and partition 17 is higher than level 20 in the remainder of the compartment. Arranged between the lower end of partition 17 and middle wall 15 is a slit-like opening 21. In this arrangement the distance between lower edge 22 of partition 17 and middle wall 15 can be 3–5 mm. In the embodiment described the total capacity of one compartment is 200 cm$^3$. By means of weight 23, however, the receptacle is calibrated to tilt when filled with 100 g.

As the measurement of the amount of liquid is based on weighing, the measurement is not affected by frothing.

It will be clear that the dimensions mentioned are not critical for the receptacle, and that the latter can be made of any size.

Each tipping movement of the receptacle is registered by a counter (not shown), which may be of any known construction and arrangement and does not constitute part of the present invention.

The difference in level between the communicating chambers with high rates of flow is presumably due to the fact that the strong current of liquid forces the liquid between middle wall 15 and partition 17 through opening 21 to the chamber on the other side of partition 17.

I claim:

1. In a weigher for a liquid including a receptacle having two compartments disposed under an opening through which liquid is supplied in a path of flow and arranged to be tipped about an axis by a predetermined quantity of liquid in either one of said two compartments to move the same out of said path of flow and thereby discharge its contents and to move the other one of said two compartments into said path of flow for it to be filled in turn, the improvement comprising means associated with each compartment for initiating tipping of the receptacle in advance of the accumulation of said predetermined quantity of liquid in response to an increase in the rate of flow of the liquid into the respective compartment, said means including partition means in each compartment for dividing the flow of incoming liquid and for directing first and second portions thereof simultaneously to different levels in the respective compartment in response to changes in the rate of flow of incoming liquid.

2. A weigher as in claim 1 wherein said partition means together with the walls of its respective compartment forms two upwardly extending chambers in communication with each other.

3. A weigher according to claim 1, comprising a receptacle having two sidewalls, two end walls, a middle wall disposed in the bisectrix plane of the angle between said two end walls, and dividing said receptacle into two compartments, and a partition in each compartment disposed in spaced parallel relationship to the end wall thereof and dividing the compartment into two communicating chambers.

4. A weigher according to claim 2, wherein said communicating chambers are in communication with one another through a slit-like opening between said middle wall and the under edge of the partition.

5. A weigher according to claim 2, wherein said communicating chambers are in communication with one another through a slit-like opening between said middle wall and the under edge of the partition, said slit-like opening being disposed under the opening through which liquid is supplied.

* * * * *